United States Patent [19]

Richardson et al.

[11] Patent Number: 4,616,810
[45] Date of Patent: Oct. 14, 1986

[54] LIQUID COOLED SHOCK ABSORBER

[76] Inventors: Wayne U. Richardson; Robert H. Richardson, both of 862 N. Pleasant St., Southington, Conn. 06489

[21] Appl. No.: 716,963

[22] Filed: Mar. 28, 1985

[51] Int. Cl.⁴ .............................................. F16F 9/42
[52] U.S. Cl. .................................. 267/8 R; 180/227; 188/274; 267/140.1; 267/140.2
[58] Field of Search ............... 188/274, 264 D, 264 P; 180/227; 267/8 R, 140.2, 140.1

[56] References Cited

U.S. PATENT DOCUMENTS

| | | | |
|---|---|---|---|
| 2,195,130 | 3/1940 | Hoyt | 188/264 D |
| 2,339,535 | 1/1944 | Webster | 188/264 D X |
| 2,351,180 | 6/1944 | Ash | 188/264 D X |
| 2,597,450 | 5/1952 | Cline | 188/274 X |
| 2,667,238 | 1/1954 | Bennett | 188/274 |
| 2,862,120 | 11/1958 | Onsrud | 188/264 D |
| 3,530,965 | 9/1970 | Wilson | 188/264 D X |
| 3,795,291 | 3/1974 | Naito et al. | 188/315 X |
| 4,540,193 | 9/1985 | Noda et al. | 180/227 |

FOREIGN PATENT DOCUMENTS

| | | | |
|---|---|---|---|
| 2446643 | 4/1976 | Fed. Rep. of Germany | 180/227 |
| 1144380 | 4/1957 | France | 188/274 |
| 60-39590 | 9/1985 | Japan . | |
| 852503 | 10/1960 | United Kingdom | 267/8 R |
| 737255 | 5/1980 | U.S.S.R. | 188/274 |

Primary Examiner—George E. A. Halvosa

[57] ABSTRACT

A hydraulic shock absorber for a motorcycle employs a jacket which surrounds the damping chamber of the shock absorber. The damping chamber contains damping fluid and a damping piston for providing reciprocating axial damping displacement in accordance with axial forces exerted on a shaft connecting the damping piston. The jacket forms an annular outer chamber. Fluid circulates through the outer chamber to stabilize the temperature of the damping fluid in the damping chamber. The outer chamber is connected for fluid communication with the cooling system of the vehicle engine.

13 Claims, 4 Drawing Figures

LIQUID COOLED SHOCK ABSORBER

BACKGROUND OF THE INVENTION

This invention relates generally to hydraulic shock absorber devices. More particularly, this invention relates to a new and improved shock absorber employed in the suspension system of a motorcycle or other vehicle.

A well-recognized problem associated with hydraulic shock absorbers employing a damping piston which reciprocates in a cylinder filled with a damping fluid are the temperature dependent damping characteristics of the shock absorber. Generally an increase in the temperature of the damping fluid decreases the viscosity of the fluid and adversely effects the damping characteristics of the shock absorber. When a vehicle travels over a rough terrain under intense operational conditions such as may occur during motocross racing, the rapid reciprocative axial movement of the damping piston causes the temperature of the damping fluid to rise rapidly. The temperature increase to the damping fluid is exacerbated when the ambient temperature is relatively high and the vehicle is being operated at relatively high speeds. Under such conditions, the viscosity of the damping fluid may decrease to a very low level wherein the damping characteristics of the damping piston may be greatly diminished resulting in a significant lessening of the vehicle stability and ultimately jeopardizing the driveability of the vehicle.

A number of devices and techniques have been advanced to eliminate or compensate for the adverse temperature dependant operational characteristics normally inherent in a hydraulic shock absorber. In U.S. Pat. No. 2,785,774 an outer sleeve is positioned within a shock absorber cylinder to divide the hydraulic fluid chamber into two chambers. The hydraulic fluid is cooled by causing a uni-directional flow of the hydraulic fluid into the chambers for continuously removing heat from the fluid. U.S. Pat. No. 4,337,849 discloses a modification to a conventional shock absorber by adding an additional cylinder concentric with the shock absorber to form an annular reservoir around the shock absorber. Temperature sensitive valves are employed to release heated oil from the damping chamber to the reservoir for cooling the oil. In U.S. Pat. No. 3,795,291 a shock absorber for a motorcycle employs an outer casing which constitutes a fluid storage chamber. The fluid storage chamber connects to a cooling device for cooling hydraulic fluid in the chamber. The cooling device includes cooling fins for dissipating the heat with the damping fluid being circulated to the cooling device.

BRIEF SUMMARY OF THE INVENTION

The present invention is a new and improved shock absorber which differs from the foregoing noted shock absorbers by providing a temperature compensation means which employs a liquid coolant. The liquid coolant is brought into a heat exchange relationship with the damping fluid of the shock absorber, but is in fluid isolation from the damping fluid. The shock absorber of the present invention is particularly adapted for incorporation with the engine cooling system of the vehicle to provide a circulation of fluid through the shock absorber.

Briefly stated, the invention in a preferred form is a temperature stabilizable shock absorber for a motorcycle or other vehicle which comprises a cylinder forming a generally fluid tight damping chamber. A damping piston is received by the cylinder and axially displaceable therein. A shaft projects through an end of the cylinder and connects the piston to produce a reciprocating damping displacement of the piston in response to axial forces applied to the shaft. A fluid reservoir supplies a source of damping fluid to the cylinder. Means are provided for mounting a suspension spring for biasing the shaft for projection from the cylinder. Means are also provided for mounting the shaft and the cylinder to the vehicle. A jacket forms a stabilizing chamber at least partially surrounding the cylinder. The stabilizing chamber is in fluid isolation from the damping chamber and the reservoir. The stabilizing chamber has an inlet section and an outlet section which are in fluid communication. A fluid inlet connector connects the inlet section for remote fluid communication and a fluid outlet connector connects the outlet section for remote fluid communication so that a fluid entering the fluid inlet connector circulating through the stabilizing chamber and exiting the fluid outlet connector acts to substantially stabilize the temperature of the damping fluid in the damping chamber.

In preferred form, the jacket comprises a cylinder concentric with the main damping cylinder to form a substantially annularshaped stabilizing chamber. A pair of angularly spaced axially extending partition members are disposed in the stabilizing chamber to form an inlet section which leads to the main portion of the stabilizing chamber. A circumferentially extending collar concentrically disposed at one end of the cylinder mounts an inlet connector fitting and an outlet connector fitting at diametrically opposite locations of the collar.

An object of the invention is to provide a new and improved hydraulic shock absorber having means for stabilizing the temperature of the damping fluid.

Another object of the invention is to provide a new and improved shock absorber employing a fluid cooling system which is integrated with the engine cooling system of the associated vehicle.

Another object of the present invention is to provide a new and improved temperature compensated hydraulic shock absorber having an efficient construction which which is adapted to relatively easily mounted into the suspension system of a motorcycle.

Other objects and advantages of the invention will become apparent from the drawing and the specification.

DETAILED DESCRIPTION OF THE INVENTION

Figure 1:
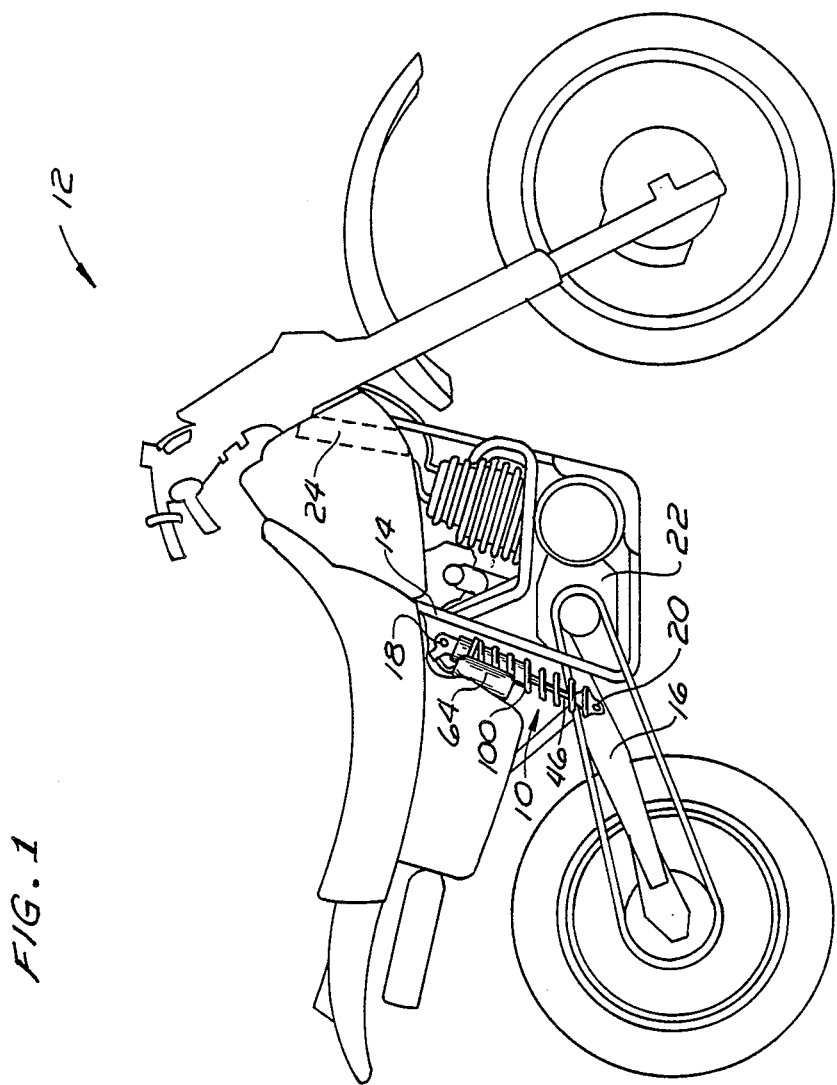
FIG. 1 is a side-elevational view, partly broken away, of a motorcycle having a shock absorber of the present invention.

With reference to the drawing wherein like numerals represent like parts throughout the several Figures, a temperature stabilizable liquid cooled shock absorber in accordance with the present invention is generally designated by the numeral 10. The shock absorber is especially adaptable for use in a motorcycle or other vehicle for incorporation into the vehicle suspension system. With specific reference to FIG. 1, a motorcycle generally designated by the numeral 12 includes a chassis frame 14 and a rear fork 16. Opposing ends of shock absorber 10 are pivotally mounted to the frame 14 and the rear fork 16 by shock bolts 18 and 20, respectively. Shock absorber 10 is a principal component of the rear suspension system for the motorcycle.

Figure 2:
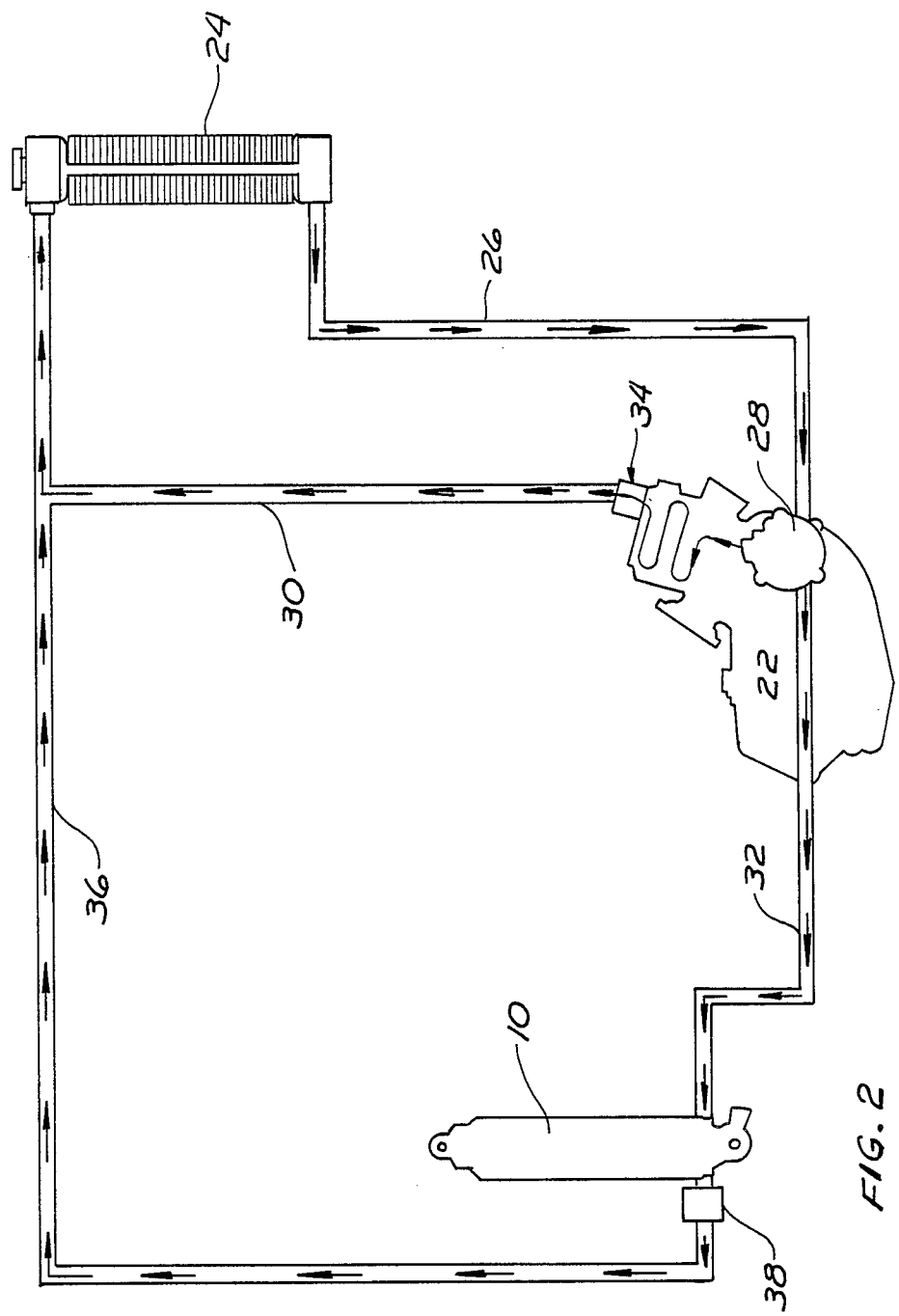
FIG. 2 is a schematic view of the shock absorber of FIG. 1 and the motorcycle engine cooling system with which the shock absorber of the present invention is preferably employed.

With additional reference to FIG. 2, motorcycle 12 employs a water cooled engine 22. A radiator 24 contains a reservoir of coolant which flows through a radiator hose 26 to a water pump 28 which is driven by the engine. The water pump circulates coolant through the engine for return to radiator 24 via return hose 30. The foregoing circulation may be controlled by a thermostatic valve 34 which selectively controls the flow of the coolant from the hose 30 to the radiator inlet in accordance with the temperature of the coolant. Valve 34 may be of a conventional form which is closed to the passage of coolant until the surrounding coolant reaches a threshold temperature and the valve opens.

An inlet conduit 32 connects the foregoing engine coolant system with shock absorber 10. A return conduit 36 controlled by a second thermostatic valve 38 connects shock absorber 10 with the radiator for returning coolant to the radiator as will be described below. Thermostatic valve 38 may be configured to selectively open and close to provide a circulation path through shock absorbers at a pre-established temperature level of the coolant which is different than the threshold temperature value for thermostatic valve 34. Valves 34 and 38 should be regarded as optional. Alternately, temperature actuated valves which selectively control fluid flow over a wide spectrum of flow rate settings may be employed. The arrows indicate the direction of the flow of fluid through the foregoing described fluid circulation system. The illustrated motorcycle 12 is merely exemplary of numerous types and models of motorcycles which employ water cooled engines for which the present invention is particularly directed.

Figure 3:
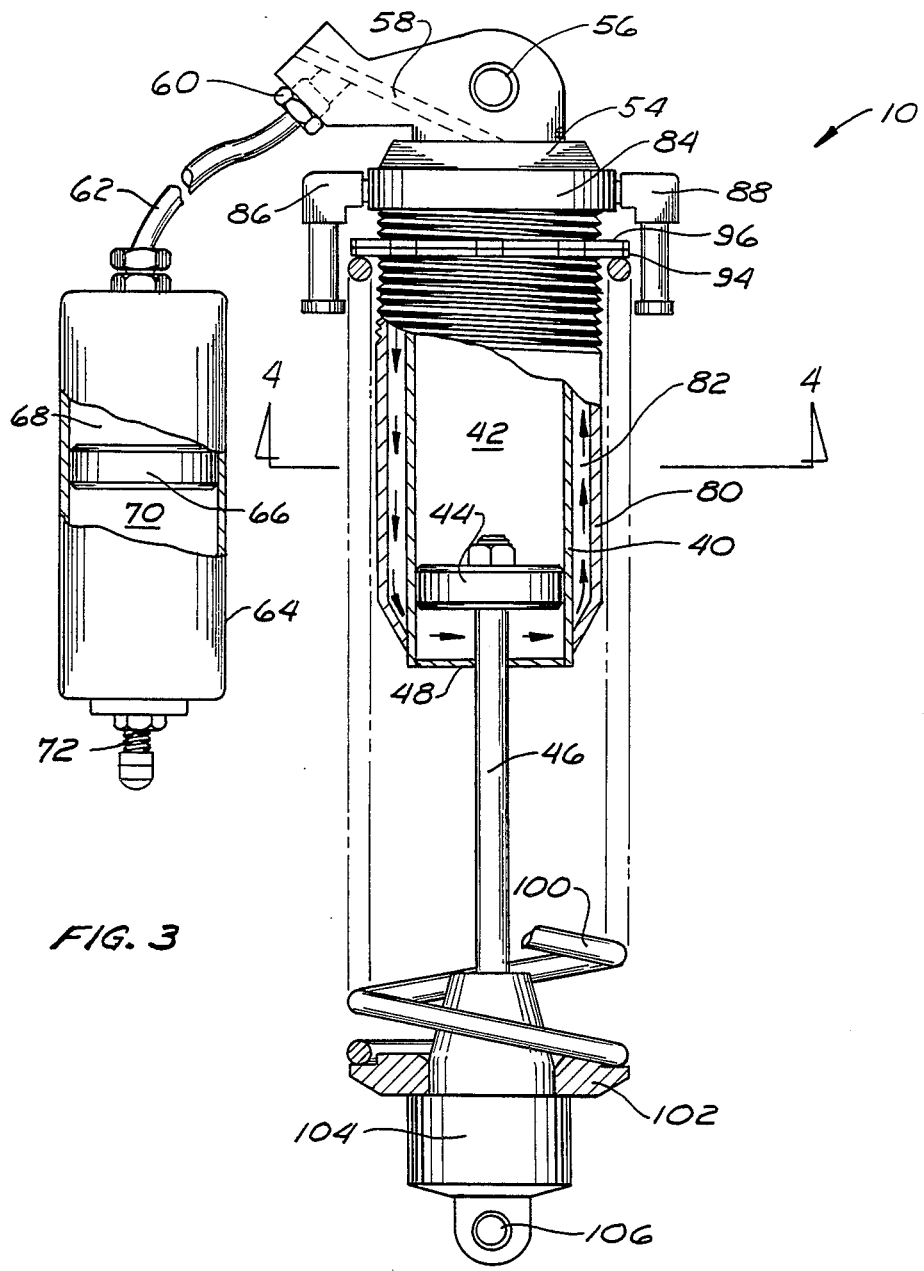
FIG. 3 is an axial sectional view, partly in section and partly broken away, of the shock absorber of FIG. 1.

With reference to FIG. 3, shock absorber 10 comprises an inner metal cylinder 40 forming a damping chamber 42 for receiving a damping piston 44. A shaft 46 connects with piston 44 and projects axially through the end of the cylinder. A cap assembly 48 includes a seal for sealing against the axially displaceable shaft and sealing the cylinder in a fluid tight relationship. Damping piston 44 includes a plurality of one-way passages and check valves (not illustrated) providing unidirectional fluid flow in each direction between the fluid chambers formed in damping chamber 42 by the damping piston 44. The restricted rate of flow through piston 44 provides oscillatory reciprocating damping action to the piston. Damping chamber 42 is filled with oil or other suitable damping fluid. Axial forces applied to shaft 46 result in a damping reciprocative axial displacement of piston 44 and hence shaft 46 in accordance with the fluid characteristics of the oil and the physical structure of the fluid communication structures of the piston.

A mounting base 54 rigidly protrudes from the upper end of cylinder 40. Mounting base 54 includes a mounting slot which receives a pivotal spherical bearing assembly 56. Bearing assembly 56 receives shock bolt 18 for pivotally securing the base end of the shock absorber to the vehicle frame. A fluid passage 58 extends obliquely through the mounting base 54 for communication at the end of damping chamber 42. A hose fitting 60 is received in the base for connecting a reservoir hose 62. Hose 62 connects with an auxiliary reservoir cylinder 64.

Reservoir cylinder 64 receives a piston 66 which is axially displaceable in the cylinder. Piston 66 generally forms a circumferential radial seal with the interior of the cylinder to provide an oil chamber 68 and a segregated fluid chamber 70 which is filled with pressurized nitrogen gas. The damping oil in chamber 68 is in fluid communication via hose 62 and passage 58 with the damping chamber 42. The pressurized gas in fluid reservoir 70 functions to maintain the oil pressure in the shock cylinder. A pressure release valve 72 is located in the end of the reservoir cylinder. The reservoir cylinder is mounted to the motorcycle frame in close proximity to the shock cylinder as illustrated in FIG. 1. An oil reservoir (not illustrated) may be disposed in the main body of the shock absorber rather than a separate auxiliary reservoir cylinder as illustrated.

A second metal cylinder 80 generally concentric with cylinder 40 forms a generally annular chamber 82 surrounding cylinder 80. The annular chamber 82 is in a heat exchange relationship with the damping fluid in damping chamber 42. However, there is no fluid communication between annular chamber 82 and damping chamber 42. The foregoing chambers are separated by the metal cylinder 40 which functions as an efficient heat exchange material. In addition, the geometric configurations and relative dispositions of chambers 42 and 82 provide a relatively large heat exchange region within the shock absorber. The outer end of the cylinder 80 is tapered and may be sealed against cylinder 70 by welding or other suitable manufacturing process.

An annular collar 84 near the mounting base threadably mounts a generally axially extending inlet connector fitting 86 and a diametrically opposed axially extending outlet connector fitting 88. Fittings 86 and 88 are preferably L-shaped brass members which are adapted for receiving the ends of hoses of inlet conduit 32 and return conduit 36 to provide fluid circulation through annular chamber 82. The connector fittings are adapted to connect with the hoses in a generally axial orientation due to the limited pivotal movement of the shock absorber relative to the vehicle mounting location. Alternatively, the fittings may be configured and oriented at other selective angles to accommodate the dimensional constraints presented by a given motorcycle.

Figure 4:
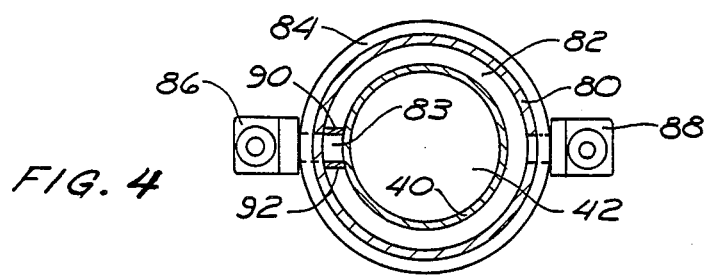
FIG. 4 is a cross-sectional view of the shock absorber of FIG. 3 taken along the line 4—4.

With reference to FIG. 4, a pair of angularly spaced, axially extending interior partitions 90 and 92 form a narrow, axially extending inlet passage 83 within annular chamber 82. Inlet passage 83 opens at one end at the inlet passage of the inlet fitting 86 and empties at the other end for fluid communication into the remaining main portion of the annular chamber 82 for ultimate communication with the outlet passage through the outlet fitting 88 in the general direction of the arrows shown in FIG. 3. The partitions may be metal strips, wood strips, or beads of welding material. The inlet passage configuration functions to provide an efficient means for substantially uniformly distributing the fluid flow throughout substantially the entire chamber 82, thus enhancing the temperature stabilization characteristics of the shock absorber. Other means for distributing the fluid flow within chamber 82 may also be employed.

The exterior surface of cylinder 80 is threaded for receiving an axially adjustable spring retainer nut 94 and a cooperating lock nut 96. Adjustable retainer nut 94 seats one end of a suspension coil spring 100. The other end of suspension spring 100 is seated by a flared retainer 102 which connects at the terminal end of shaft 46. Suspension spring 100 may assume a variety of conventional forms but may have a slightly enlarged diameter to accommodate the interiorly received body of the shock absorber which may have a greater diameter than that of the conventional shock absorber due to the outer cylinder 80. The tension on suspension spring 100 may be adjusted by threadably axially adjusting retainer nut 94. Lock nut 96 is threaded against retainer nut 94 for securing the retainer nut at a fixed axial position. A mounting extension 104 extends from the terminus of shaft 46 and includes a central recess for receiving a pivotal spherical bearing assembly 106. Shock bolt 18 is received in bearing assembly 106 for mounting the end of the shaft to the rear fork 16 of the motorcycle.

In operation, the axially acting forces exerted on shaft 46 are translated to the damping piston 44 to provide an axial damping displacement of the suspension coil/-shock absorber assembly. The inlet conduit 32 and the return conduit 36 connect the shock absorber with the engine cooling system so that coolant from the radiator for the cooling system also circulates through annular chamber 82 in a flow path which traverses through inlet fitting 86, inlet passage 83 of the annular chamber, the main region of the annular chamber, and through outlet fitting 88 for return to the radiator. The pressure produced by the engine cooling system is sufficient to provide fluid circulation through the shock absorber. Heat is exchanged between the damping oil in chamber 40 and the coolant in chamber 80. The fluid circulation through chamber 80 provides an efficient means for continuously removing heated coolant and re-supplying coolant at a lower temperature. The foregoing liquid circulation system provides a means for stabilizing the temperature of the oil or damping fluid at the interior of the damping chamber. In conventional shock absorbers as the temperature increases, the oil becomes thinner and the damping characteristics of the shock absorber are thereby greatly diminished due to the loss of viscosity of the damping fluid. The diminishing damping characteristics result in a significant decrease in the stability of the vehicle and may drastically effect the operation of the vehicle. In accordance with the present invention, the annular chamber 82 formed by the second cylinder 80 provides an efficient means for dissipating the increased heat caused by the rapid extension and retraction movements of the damping piston to thereby stabilize the temperature of the damping fluid during conditions wherein the hydraulic shock absorber is undergoing very efficient and rapid successive extension and retraction movements. By incorporating the cooling system with the engine cooling system a very stable coolant circulation system is established. The temperature stabilizing system which employs the engine coolant is in fluid isolation from the oil in the hydraulic shock absorber.

During operation of the vehicle, the circulation flow rate through the shock absorber may be automatically controlled by valves 34 and 38 as well as other control valves not illustrated. The flow rate may also be pre-established by dimensioning the inlet conduit 32 and return conduit 36 as well as suitably dimensioning the inlet and outlet passages through the fittings. The fluid flow path in chamber 82 may also be configured to provide desirable flow characteristics.

While a preferred embodiment has been set forth for purposes of illustration, the foregoing description should not be deemed a limitation of the invention herein. Accordingly, various adaptations, modifications and alternatives may occur to one skilled in the art without departing from the spirit and scope of the present invention.

What is claimed is:

1. A temperature stabilizable shock absorber for a motorcycle or other vehicle comprising:
   cylinder means to form a generally fluid tight damping chamber;
   damping piston means received by said cylinder means and axially displaceable therein comprising a piston connecting a shaft projecting through an end of said first cylinder means to produce a reciprocating damping displacement of said piston in response to axial forces applied to said shaft;
   fluid reservoir means to supply a source to damping fluid for said damping chamber;
   shaft mounting means to mount an end of said shaft to a vehicle;
   cylinder mounting means to mount said cylinder means to a said vehicle;
   jacket means to form a stabilizing chamber at least partially surrounding said damping chamber and extending axially therealong said stabilizing chamber being in fluid isolation relative to said damping chamber and said reservoir means and forming a generally axially extending first passage having an inlet opening and a generally axially extending second passage having an outlet opening in fluid communication therewith, said openings being disposed at the same general axial position of said stabilizing chamber; and
   suspension spring means comprising a coil spring surrounding said jacket means for axially biasing said shaft for projection from said cylinder means said spring means having opposite ends, both said ends being axially spaced from said openings in one axial direction of said jacket means;
   so that a fluid circulating in said stabilizing chamber between said inlet opening and said outlet opening traverses said first passage in a generally axially extending direction and circulates said second passage in a generally opposing axial direction along a circulation path which is in heat exchange relationship with said damping fluid and said spring.

2. The shock absorber of claim 1 wherein said jacket means comprises a cylinder concentric with said cylinder means to form a substantially annular shaped stabilizing chamber.

3. The shock absorber of claim 2 further comprising a pair of angularly spaced, axially exteqding partition members disposed in said stabilizing chamber to form said first and second passages.

4. The shock absorber of claim 2 further comprising a circumferentially extending collar disposed at one end of said cylinder in concentric relationship therewith, an inlet connector fitting and an outlet connector fitting being mounted to said collar to provide fluid communication with said inlet opening and said outlet opening, respectively.

5. The shock absorber of claim 4 wherein said fittings are mounted at diametrically opposite locations on said collar and comprise an exteriorly projecting portion which defines an axially extending fluid passage.

6. The shock absorber of claim 2 wherein said cylinder has an exterior threaded surface and further comprising a seating member threadably positionable on said threaded surface for mounting said coil spring.

7. The shock absorber of claim 1 and further comprising:
   fluid circulation means to circulate fluid, including means for dissipating heat from said circulated fluid;
   first conduit means connecting said circulation means with said inlet opening to provide fluid communication therebetween; and
   second conduit means connecting said circulation means with said outlet opening to provide fluid communication therebetween.

8. The combination of claim 7 wherein said fluid circulation means comprises a radiator for cooling an engine and a water pump driven by said engine.

9. A system for stabilizing the temperature of a shock absorber comprising:
   engine cooling means for cooling an internal combustion engine including a fluid circulation path, a radiator interposed in said path and circulation means to circulate coolant through said circulation path;
   shock absorber means including a cylinder forming a generally fluid tight damping chamber, a damping piston axially displaceable in said chamber and connecting a shaft projecting through an end of said cylinder to produce a reciprocating damping displacement of said piston in response to axial forces applied to said shaft, and damping fluid supply means to provide a source of damping fluid for said damping chamber;
   jacket means to form a stabilizing chamber at least partially surrounding said damping chamber and in heat exchange relationship therewith, said stabilizing chamber being in fluid isolation relative to said damping chamber and said supply means and having an inlet opening and an outlet opening and an axially extending first passage and an axially extending second passage;
   a suspension spring surrounding said jacket means and having first and second ends, said first end being mounted to said cylinder and said second end being mounted in fixed relationship to said shaft, said ends being axially spaced from said inlet and outlet openings in the same axial direction therefrom;
   fluid inlet means to connect said inlet opening with said circulation path to provide fluid communication therebetween, and
   fluid outlet means to connect said outlet opening with said fluid circulation path to provide fluid communication therebetween so that said coolant is circulated through said stabilizing chamber in a first general direction in said first passage and in a second general direction opposite said first direction in said second passage for transferring heat from said damping fluid to thereby substantially stabilize the temperature of the damping fluid in said damping chamber.

10. The system of claim 9 wherein said jacket means comprises a cylinder concentric with said damping cylinder to form a substantially annular shaped stabilizing chamber.

11. The system of claim 10 further comprising a pair of angularly spaced axially extending partition members disposed in said stabilizing chamber to form said first and second passages.

12. The system of claim 11 further comprising a circumferentially extending collar concentrically disposed at one end of said jacket cylinder, and said fluid inlet and outlet means comprise a pair of connector fittings mounted to said collar at diametrically opposite locations on said collar.

13. The system of claim 9 further comprising thermostat means to selectively control the circulation of coolant through said circulation path in accordance with the temperature of the coolant.

* * * * *

UNITED STATES PATENT AND TRADEMARK OFFICE
CERTIFICATE OF CORRECTION

PATENT NO. : 4,616,810

DATED : October 14, 1986

INVENTOR(S) : Wayne and Robert Richardson

It is certified that error appears in the above-identified patent and that said Letters Patent are hereby corrected as shown below:

Claim 1, line 11, change second "to" to -- of --.

Claim 1, line 19, after "therealong" insert -- , --.

Claim 3, line 2, change "exteqding" to -- extending

Signed and Sealed this

Thirteenth Day of January, 1987

Attest:

DONALD J. QUIGG

Attesting Officer

Commissioner of Patents and Trademarks